(12) United States Patent
Rek

(10) Patent No.: US 7,174,129 B2
(45) Date of Patent: Feb. 6, 2007

(54) INFORMATION TRANSMISSION SYSTEM, TELECOMMUNICATIONS DEVICE SUITABLE FOR SUCH A SYSTEM AND TRANSMISSION METHOD

(75) Inventor: Leo Rek, Neuvillalais (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1087 days.

(21) Appl. No.: 09/749,713

(22) Filed: Dec. 27, 2000

(65) Prior Publication Data

US 2001/0006885 A1    Jul. 5, 2001

(30) Foreign Application Priority Data

Dec. 29, 1999    (FR) .................................. 99 16680

(51) Int. Cl.
*H04B 1/00* (2006.01)

(52) U.S. Cl. .................. 455/41.2; 455/552.1; 370/337

(58) Field of Classification Search ................ 455/403, 455/552.1, 41.1, 41.2, 426.1, 463, 41.3, 41, 455/552.2, 416; 370/329, 330, 337, 347, 370/321
See application file for complete search history.

(56) References Cited

U.S. PATENT DOCUMENTS

| | | | | |
|---|---|---|---|---|
| 5,636,264 A * | 6/1997 | Sulavuori et al. ............. 398/41 |
| 5,884,189 A * | 3/1999 | Yamazaki et al. ........ 455/552.1 |
| 6,028,853 A * | 2/2000 | Haartsen ...................... 370/338 |
| 6,131,033 A * | 10/2000 | Shi ............................. 455/446 |
| 6,360,091 B1 * | 3/2002 | Schellinger et al. ......... 455/403 |
| 6,405,027 B1 * | 6/2002 | Bell ........................... 455/403 |
| 6,434,386 B1 * | 8/2002 | Lundborg ................... 455/436 |
| 6,442,375 B1 * | 8/2002 | Parmentier ................... 455/78 |
| 6,445,731 B1 * | 9/2002 | Yamano et al. ............. 375/222 |
| 6,445,921 B1 * | 9/2002 | Bell ....................... 455/426.1 |
| 6,480,505 B1 * | 11/2002 | Johansson et al. .......... 370/449 |
| 6,683,886 B1 * | 1/2004 | van der Tuijn et al. ..... 370/458 |
| 6,893,347 B1 * | 5/2005 | Zilliacus et al. ............. 463/41 |
| 7,020,071 B2 * | 3/2006 | Mujtaba ..................... 370/208 |
| 2001/0019956 A1 * | 9/2001 | Tada .......................... 455/434 |

FOREIGN PATENT DOCUMENTS

| | | | |
|---|---|---|---|
| EP | 559972 A2 * | 9/1993 |
| GB | 2316581 A | 2/1995 |
| WO | 9929126 | 6/1999 |
| WO | WO 9929126 A1 * | 6/1999 |
| WO | WO 0106824 A1 * | 2/2001 |

* cited by examiner

*Primary Examiner*—CongVan Tran
(74) *Attorney, Agent, or Firm*—Larry Liberchuk

(57) ABSTRACT

An information transmission system is formed by a first transmission assembly and second transmission assembly. A telecommunications device is provided to have access to these two assemblies of the time-division type to produce information pulses at times that differ from each other. Thus, double traffic is obtained simultaneously.

11 Claims, 3 Drawing Sheets

INFORMATION TRANSMISSION SYSTEM, TELECOMMUNICATIONS DEVICE SUITABLE FOR SUCH A SYSTEM AND TRANSMISSION METHOD

The invention relates to an information transmission system formed by a first transmission assembly, at least a second transmission assembly and a telecommunications device comprising access means to said transmission assemblies.

The invention likewise relates to a telecommunications device suitable for such a system and a transmission method implemented in such a system.

The invention finds its application in the transmission domain.

Such systems are known. On this subject may be consulted British Patent Document referenced GB 2 316 581.

This document describes a system in which the telecommunications device may simultaneously come into contact again with the systems, which represents a loss of time when information is to be exchanged with the two assemblies.

The present invention proposes a device of the type defined in the opening paragraph which permits to be connected with at least two systems at the same time and to save time for the exchange of information between the two assemblies.

For this purpose such a device is characterized in that the two assemblies are of the time-division type to produce information pulses at times that differ from each other.

The idea of the invention is based on the fact that certain systems which operate according to criterions which belong to the TDMA type of systems have cycles during which the transmission periods are short compared to the much longer rest periods, so that it is possible to transmit information for at least another system during these rest periods.

These and other aspects of the invention are apparent from and will be elucidated, by way of non-limitative example, with reference to the embodiment described hereinafter.

Figure 1:
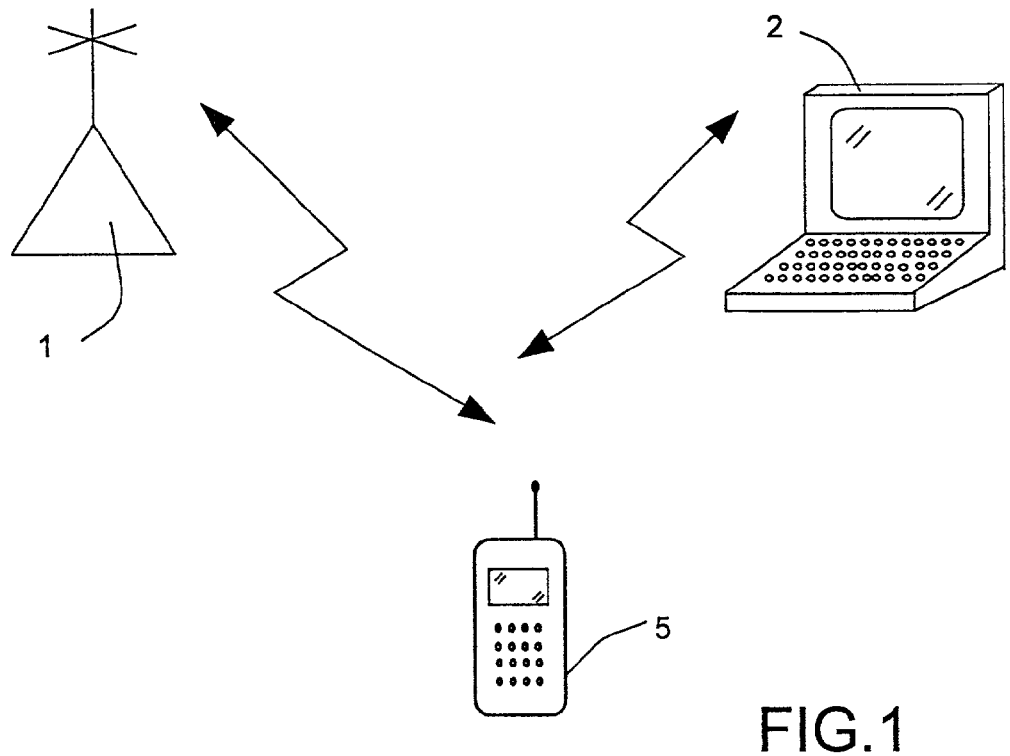
FIG. 1 represents a device in according with the invention.

FIG. 1 represents a system in accordance with the invention. Within the framework of the described example, the first assembly is a DECT system (or GSM system), part of which is represented in the Figure by a pylon or a base station referred to as 1, whereas another assembly is a system satisfying the standards called "Blue Tooth", comprising a part situated on a computer terminal 2. The telecommunications device carries reference 5 and comprises the other parts of said two assemblies.

Figure 2:
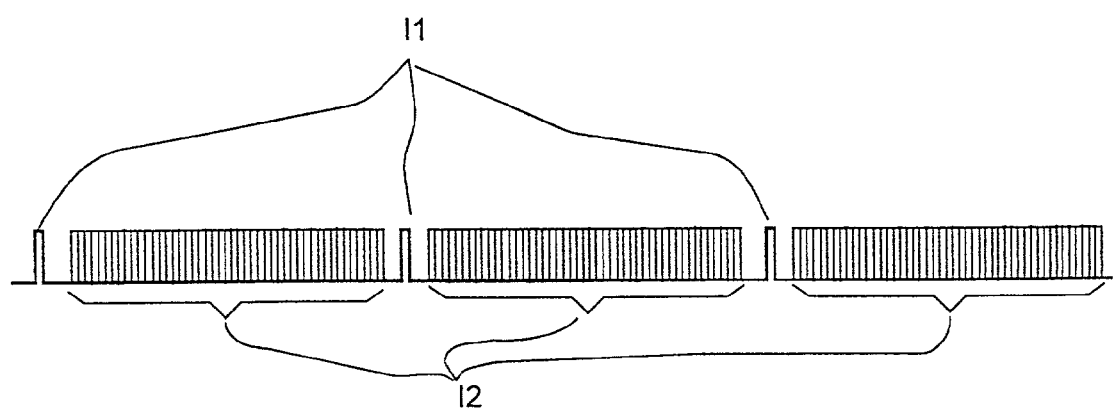
FIG. 2 represents a function flow chart of the device in accordance with the invention.

According to the invention the transmission of the information between the device 5 and the pylon or the base station 1 is effected by means of pulses I1 whose pattern and time-division are shown in FIG. 2. Between these pulses I1, pulse packets I2 are transmitted or received for the exchange of information between the telecommunications device 5 and the terminal 2.

Figure 3:
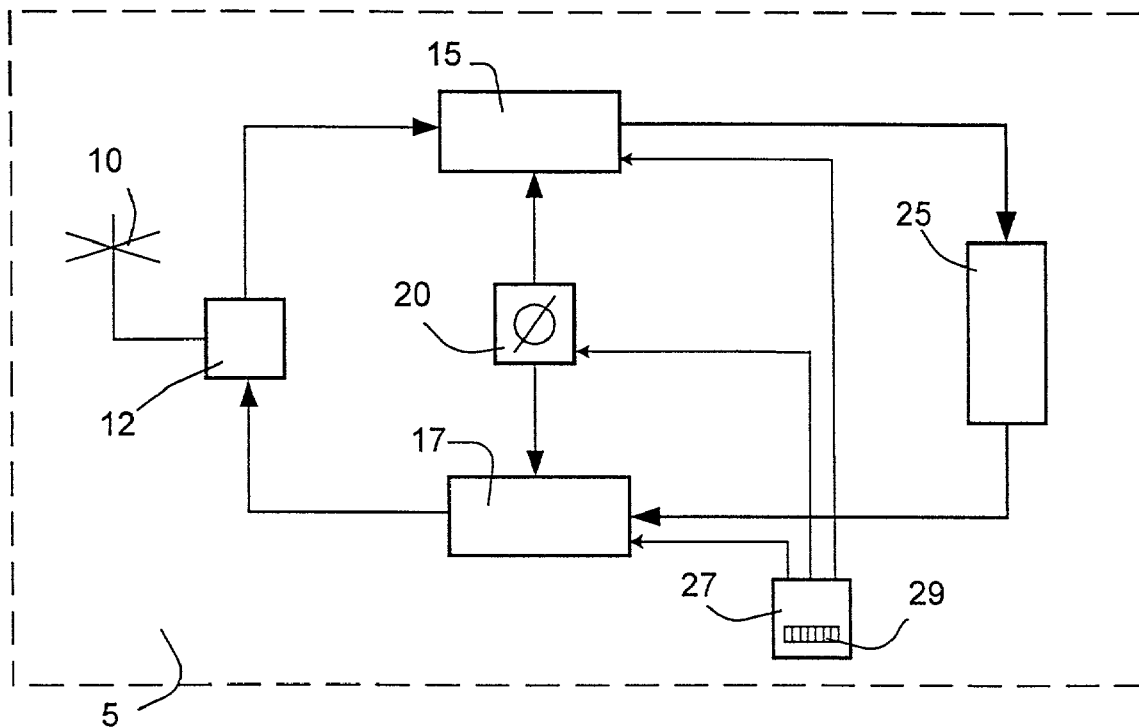
FIG. 3 is a flow-chart explaining the operation of the transmission device according to the invention.
Figure 4:
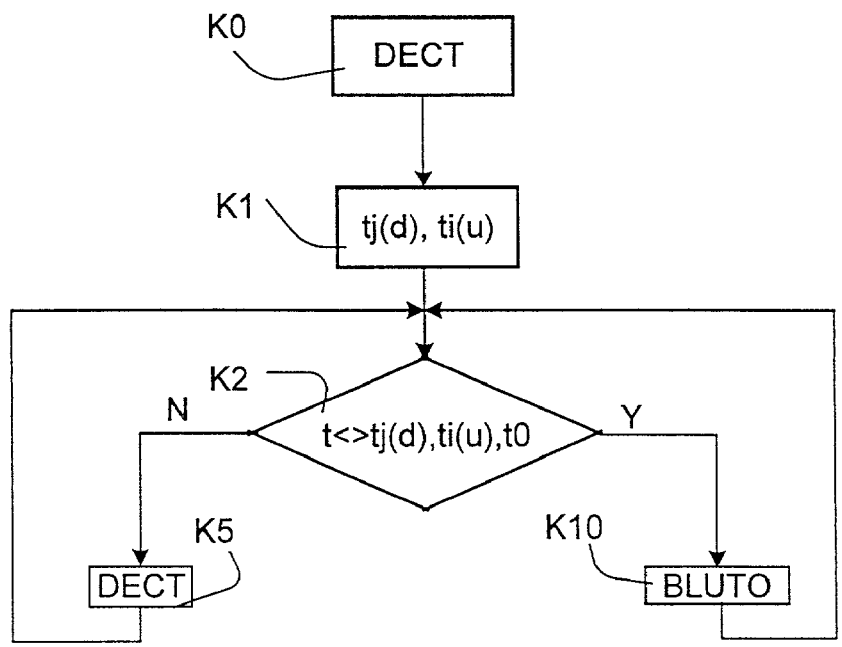
FIG. 4 is a timing diagram explaining the operation of the invention in the case where the first assembly satisfies the DECT standards and the second assembly satisfies the DECT specifications.

FIG. 3 shows a diagram of the transmission device 5 in accordance with the invention. It is formed by an antenna 10 which is used both for transmission and reception through a duplexer 12. This antenna receives signals to be transmitted to a receiving part 15 and transmits other signals coming from a transmitting part 17. The carrier frequencies of the transmitted signals and received signals are fixed by means of a local oscillator 20. A user circuit 25 receives, on the one hand, the data received from the receiving part and produces, on the other hand, data for the transmitting part. A processor-based control circuit 27 permits to control the simultaneous transmission according to the two transmission systems of this described example. The operation of this circuit 27 necessitates the presence of a timing counter 29. This operation is explained with the aid of FIG. 4.

There will be considered the case where the first system satisfies the DECT standards arid the second system the already cited system specifications known by the name of "Blue Tooth". The device 5 is connected first to the DECT network system, which is explained by the box K0 of FIG. 4. This determines (box K1) the times ti(u) and tj(d) respectively assigned to the times allotted to the upgoing traffic and downgoing traffic between the device 5 and the DECT base station referred to as 1 in FIG. 1. The counter 29 is synchronized at "0" with the synchronization pulses referred to as DUM in FIG. 5. The DECT frame is divided into 24 parts by the counter 29 whose contents "t" therefore vary from 0 to 23. The time ti(u) corresponds in the Figure to contents equal to 20 and the time ti(d) to 8. The contents "t" of the counter 29 are tested, which is indicated in box K2 The times ti(u) and tj(d) and the times to corresponding to the synchronization times of the DECT frame are thus assigned to the DECT transmission, which is indicated in box K5. If one is outside these times, then the packer transmission according to the "Blue Tooth" specifications is permitted, box K10.

Figure 5:
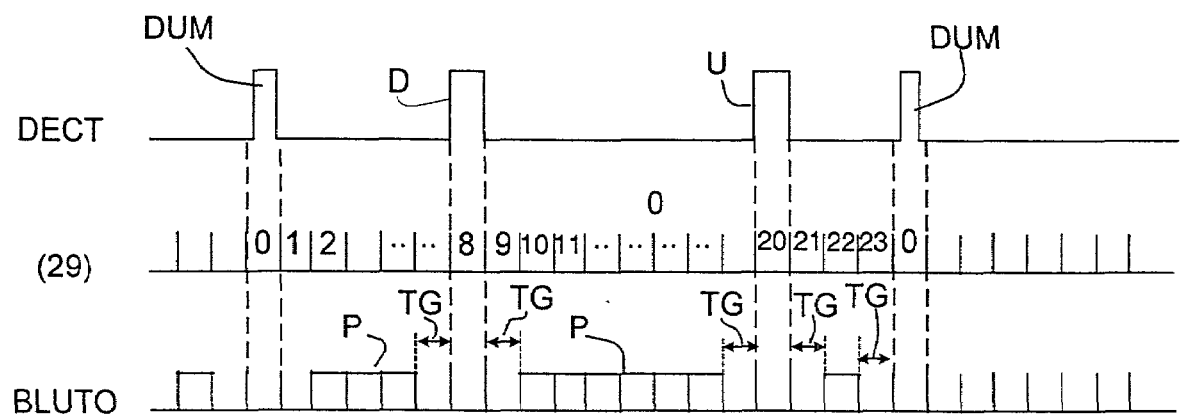

FIG. 5 shows on the line BLUTO the transmission in packets P, outside information pulses DUM, U, D assigned to the DECT system. It should be noted that it is necessary to provide guard times TG between the DECT transmission and the transmission of the packets P of the system "Blue Tooth".

Thus, by means of the invention it is possible to transfer data on a computer equipped with the "Blue Tooth" system. These data may come, for example, from an Internet server accessed by means of the telephone network to which the DECT system is connected.

It should be observed that the example described shows a particularly advantageous embodiment of the transmission device 5. Actually, the transmitting part 17 and the receiving part 15 are shared by the two systems. Thus it is not necessary to provide too much additional hardware.

While the embodiments of the invention disclosed herein are presently considered to be preferred, various changes and modifications can be made without departing from the spirit and scone of the invention. The scope of the invention is indicated in the appended claims, and all changes that come within the meaning and range of equivalents are intended to be embraced therein.

The invention claimed is:

1. An information transmission system, comprising:
    at least two dissimilar transmission assemblies; and
    a telecommunications device operable in accordance with
        a fixed time division multiple access to exchange
        information pulses with the at least two dissimilar
        transmission assemblies, wherein said telecommunications device is operable to allocate a first at least one fixed time slot to a first transmission assembly for an exchange of a first set of information pulses between the telecommunications device and the first transmission assembly; and wherein said telecommunications device is operable to allocate a second at least one fixed time slot to a second transmission assembly for an exchange of a second set of information pulses between the telecommunications device and the second transmission assembly.

2. The information transmission system of claim 1, wherein a first transmission assembly operates in accordance with a DECT standard; and wherein a second transmission assembly operates in accordance with "Blue Tooth" specifications.

3. The information transmission system of claim 1, wherein said first transmission assembly operates in accordance with a DECT standard; and wherein said second transmission assembly operates in accordance with "Blue Tooth" specifications.

4. The information transmission system of claim 1, wherein said telecommunications device is a mobile station of a DECT type.

5. A telecommunications device, comprising:

a transceiver operable to connect the telecommunications device to at least two dissimilar transmission assemblies; and a processor in electrical communication with said transceiver, wherein said processor is operable in accordance with a fixed time division multiple access to exchange information pulses with the at least two dissimilar transmission assemblies, wherein a first at least one fixed time slot is allocated to a first transmission assembly for an exchange of a first set of information pulses between the telecommunications device and the first transmission assembly; and wherein a second at least one fixed time slot is allocated to a second transmission assembly for an exchange of a second set of information pulses between the telecommunications device and the second transmission assembly.

6. The telecommunications device of claim 5, wherein the telecommunications device is a mobile station of a DECT type.

7. The telecommunications device of claim 5, wherein the first transmission assembly operates in accordance with a DECT standard; and wherein the second transmission assembly operates in accordance with "Blue Tooth" specifications.

8. A method of operating a telecommunications device, the method comprising:

connecting to at least two dissimilar transmission assemblies; and exchanging information pulses in accordance with a fixed time division multiple access between the telecommunications device and the at least two dissimilar transmission assemblies, wherein the exchanging of information pulses includes allocating a first at least one fixed time slot to a first transmission assembly and exchanging information pulses between the telecommunications device and the first transmission assembly during the first at least one fixed time slot.

9. The method of claim 8, wherein the telecommunications device is a mobile station of a DECT type.

10. The method of claim 8, wherein exchanging information pulses in accordance with a fixed time division multiple access between the telecommunications device and the at least two dissimilar assemblies further includes:

allocating a second at least one fixed time slot to a second transmission assembly; and exchanging information pulses between the telecommunications device and the second transmission assembly during the second at least one fixed time slot.

11. The method of claim 10, wherein the first transmission assembly operates in accordance with a DECT standard; and wherein the second transmission assembly operates in accordance with "Blue Tooth" specifications.

* * * * *